United States Patent
Wu et al.

(10) Patent No.: US 12,253,767 B2
(45) Date of Patent: Mar. 18, 2025

(54) METHOD FOR MANUFACTURING PDLC MEMBRANE ELECTRODE, NEGATIVE PRESSURE PLATFORM AND PDLC MEMBRANE

(71) Applicant: SHANGHAI LONGSHENG PHOTOELECTRIC NEW MATERIAL CO., LTD., Shanghai (CN)

(72) Inventors: Yung-Lung Wu, Jiangsu (CN); Pin-Hung Lee, Jiangsu (CN); Rui Sun, Jiangsu (CN)

(73) Assignee: SHANGHAI LONGSHENG PHOTOELECTRIC NEW MATERIAL CO., LTD., Shanghai (CN)

(*) Notice: Subject to any disclaimer, the term of this patent is extended or adjusted under 35 U.S.C. 154(b) by 429 days.

(21) Appl. No.: 17/766,700

(22) PCT Filed: Feb. 4, 2021

(86) PCT No.: PCT/CN2021/075325
§ 371 (c)(1),
(2) Date: Apr. 5, 2022

(87) PCT Pub. No.: WO2022/126847
PCT Pub. Date: Jun. 23, 2022

(65) Prior Publication Data
US 2023/0194936 A1    Jun. 22, 2023

(30) Foreign Application Priority Data
Dec. 14, 2020 (CN) .......................... 202011470771.9

(51) Int. Cl.
*G02F 1/1343* (2006.01)
*B23K 26/50* (2014.01)
*G02F 1/1334* (2006.01)

(52) U.S. Cl.
CPC .......... *G02F 1/13439* (2013.01); *B23K 26/50* (2015.10); *G02F 1/1334* (2013.01)

(58) Field of Classification Search
CPC .... G02F 1/13439; G02F 1/1334; B23K 26/50
(Continued)

(56) References Cited

U.S. PATENT DOCUMENTS
2022/0035197 A1   2/2022 Otsuka et al.

FOREIGN PATENT DOCUMENTS
CN    103038701 A    4/2013
CN    108445667 A    8/2018
(Continued)

OTHER PUBLICATIONS

Espacenet English machine translation of CN103038701A (Year: 2013).*
(Continued)

*Primary Examiner* — Dung T Nguyen
*Assistant Examiner* — David Y Chung
(74) *Attorney, Agent, or Firm* — IP & T GROUP LLP

(57) ABSTRACT

Provided are a method for manufacturing a PDLC membrane electrode, a negative pressure platform, and a PDLC membrane. The method for manufacturing a PDLC membrane electrode includes the following steps: placing a PDLC membrane on a negative pressure platform with a side to be processed facing upwards, and making a liquid crystal activation area of the side to be processed of the PDLC membrane coincide with a transparent area of the negative pressure platform, and other area coincides with a main body area of the negative pressure platform; activating
(Continued)

a liquid crystal layer of the PDLC membrane; cutting and tearing off, according to a half-cut area, a PET layer and an electric conduction layer located on the liquid crystal layer, and sweeping or tearing off the activated liquid crystal layer together to expose the electric conduction layer below the liquid crystal layer to form a corresponding electrode.

15 Claims, 2 Drawing Sheets

(58) Field of Classification Search
USPC ............................................. 349/86; 29/885
See application file for complete search history.

(56) References Cited

FOREIGN PATENT DOCUMENTS

| | | | |
|---|---|---|---|
| CN | 108957801 | A | 12/2018 |
| CN | 109976062 | A | 7/2019 |
| CN | 110471206 | A | 11/2019 |
| CN | 111308756 | A | 6/2020 |
| CN | 111381395 | A | 7/2020 |
| JP | 2001059954 | A | 3/2001 |
| JP | 2003-294950 | A | 10/2003 |
| JP | 2004-050797 | A | 2/2004 |
| JP | 2018-537379 | A | 12/2018 |
| JP | 2019-184909 | A | 10/2019 |
| JP | 2020-173399 | A | 10/2020 |
| KR | 20080040828 | A | 5/2008 |
| WO | 2020/054445 | A1 | 3/2020 |
| WO | 2020/071110 | A1 | 4/2020 |

OTHER PUBLICATIONS

Espacenet English machine translation of CN110471206A (Year: 2019).*
First search of priority application No. CN 202011470771.9.
Notification to Grant Patent Right for Invention of priority document CN 202011470771.9 on Feb. 11, 2022.
First Office Action of priority document CN 202011470771.9 on Jul. 21, 2021.
Second Office Action of priority document CN 202011470771.9 on Jan. 7, 2022.
Supplementary search of priority document of CN202011470771.9.
First Office Action for European Patent Application No. 21865359.0 issued by the European Patent Office on Nov. 22, 2022.
Second Office Action for European Patent Application No. 21865359.0 issued by the European Patent Office on Sep. 26, 2023.
Supplementary European Search Report for European Patent Application No. 21865359 completed by the European Patent Office on Oct. 27, 2022.
Office Action for Japanese Patent Application No. 2021-572841 issued by the Japanese Patent Office on Mar. 7, 2023.
Decision to Grant a Patent of Japanese Patent Application No. 2021-572841 issued by the Japanese Patent Office on May 23, 2023.
Office Action for Korean Patent Application No. 10-2022-7006720 issued by the Korean Patent Office on Apr. 18, 2024.

* cited by examiner

METHOD FOR MANUFACTURING PDLC MEMBRANE ELECTRODE, NEGATIVE PRESSURE PLATFORM AND PDLC MEMBRANE

CROSS-REFERENCES TO RELATED APPLICATIONS

This application is a National Phase application of PCT application no. PCT/CN2021/075325 filed on Feb. 4, 2021, which claims the priority of the Chinese patent application filed with the Chinese Patent Office on Dec. 14, 2020, with the application number CN 202011470771.9 and entitled "Method for Manufacturing PDLC Membrane Electrode, Negative Pressure Platform and PDLC Membrane", the entire content of which is incorporated herein by reference.

TECHNICAL FIELD

The present disclosure relates to the technical field of electrode processing, and in particular, to a method for manufacturing a PDLC membrane electrode, a negative pressure platform and a PDLC membrane.

BACKGROUND ART

Polymer Dispersed Liquid Crystal (referred to as PDLC) is a new type of optoelectronic film material, that is, liquid crystal is dispersed in a polymer, and the formed liquid crystal droplets, under certain conditions, are uniformly dispersed in a continuous polymer matrix through polymerization reaction. Due to the optical anisotropy and dielectric anisotropy of liquid crystal molecules, PDLC becomes a composite material with electro-optical response characteristics.

Generally, the production of a PDLC membrane electrode is one of the core processes, and its main function is to connect and energize the conductive films on both sides of the PDLC membrane, so as to deflect the liquid crystal. Herein, the quality of electrode production directly lead to whether the membrane can be driven normally, whether it is fully driven, and whether there is breakdown or short circuit near the electrode.

At present, the electrode production process of PDLC membranes on the market comprises: manually cutting into sheets, dividing PDLC membrane electrodes, and erasing PDLC adhesive layer with alcohol, etc., which are basically manual operations. For example, one sheet with a size of 5000 mm×1500 mm×500 mm requires the workload of one worker working for five hours, resulting in low work efficiency and low precision; alternatively, it is processed by semi-automatic equipment and then spliced manually, leading to the relatively low yield of the electrode production and the relatively low efficiency.

SUMMARY

The present disclosure provides a method for manufacturing a PDLC membrane electrode, a negative pressure platform, and a PDLC membrane, which can achieve higher yield of electrode production.

The present disclosure provides a method for manufacturing a PDLC membrane electrode, which comprises following steps:

placing a PDLC membrane on a negative pressure platform with a side to be processed facing upwards, and making a liquid crystal activation area of the side to be processed of the PDLC membrane coincide with a transparent area of the negative pressure platform and other area coincide with a metal material area of the negative pressure platform;

activating a liquid crystal layer of the PDLC membrane; and cutting and tearing off, according to a half-cut area, a PET (Polyethylene terephthalate, that is, polycondensate of terephthalic acid and glycol) layer and an electric conduction layer located on the liquid crystal layer, and sweeping (cleaning) off the activated liquid crystal layer to expose the electric conduction layer located under the liquid crystal layer to form a corresponding electrode.

Optionally, the method for manufacturing a PDLC membrane electrode comprises a front side processing step and a back side processing step, wherein the PDLC membrane is placed on the negative pressure platform with a front side facing upwards, and a front side liquid crystal activation area of the PDLC membrane is made to coincide with a first transparent area of the negative pressure platform, and other area coincides with the metal material area of the negative pressure platform; the liquid crystal layer of the PDLC membrane is activated; according to a front side half-cut area, a first PET layer and a first electric conduction layer located on the liquid crystal layer are cut and torn off, and the activated liquid crystal layer is swept off to expose a second electric conduction layer to form a first electrode; and the PDLC membrane is placed on the negative pressure platform with a back side facing upwards, and a back side liquid crystal activation area of the PDLC membrane is made to coincide with a second transparent area of the negative pressure platform and other area coincides with the metal material area of the negative pressure platform; the liquid crystal layer of the PDLC membrane is activated; according to a back side half-cut area, a second PET layer and a second electric conduction layer located on the liquid crystal layer are cut and torn off, and the activated liquid crystal layer is swept off to expose a first electric conduction layer to form a second electrode.

Optionally, in the activation step, an infrared laser is used for performing activation.

Optionally, when the infrared laser is used for performing activation, the infrared laser has following parameters, wherein a wavelength range is 955~1068 nm;
a frequency range is 20~80 khz,
an energy range is 1~5 J/sec;
a filling density range is 0.002~0.05 mm;
a processing speed range is 500~8000 mm/sec;
a processing thickness range is 0.05~0.3 mm;
a processing width range is 1-20 mm; and
a processing time range is 2 hr. Optionally, the activated liquid crystal layer is torn off together with the PET layer and the electric conduction layer on the liquid crystal layer, and the electric conduction layer located under the liquid crystal layer can be exposed without further sweeping.

The present disclosure also provides a negative pressure platform for implementing the method for manufacturing a PDLC membrane electrode according to any one of the foregoing embodiments. The negative pressure platform comprises a metal material area and a transparent area, with the transparent area being matched with the liquid crystal activation area of the PDLC membrane.

Optionally, material of the metal material area is steel or aluminum.

Optionally, material of the transparent area is transparent polymethyl methacrylate or crystal glass.

Optionally, the negative pressure platform is of a plate-shaped structure.

Optionally, thickness of the negative pressure platform is greater than 15 mm. The present disclosure further provides a PDLC membrane manufactured by the method for manufacturing a PDLC membrane electrode according to any one of the foregoing embodiments. The PDLC membrane comprises a membrane body, a first electrode, and a second electrode, wherein
- the membrane body comprises a first PET layer, a first electric conduction layer, a liquid crystal layer, a second electric conduction layer, and a second PET layer sequentially from top to bottom;
- the first electrode is disposed on the second electric conduction layer; and
- the second electrode is disposed on the first electric conduction layer.

BRIEF DESCRIPTION OF DRAWINGS

In order to more clearly describe the technical solutions in the embodiments of the present disclosure, the drawings that need to be used in the description of the embodiments will be briefly introduced as follows. It should be understood that the drawings in the following description are some embodiments of the present disclosure. For those ordinarily skilled in the art, without inventive effort, other related drawings can also be obtained based on these drawings.

REFERENCE NUMBERS

Figure 1:
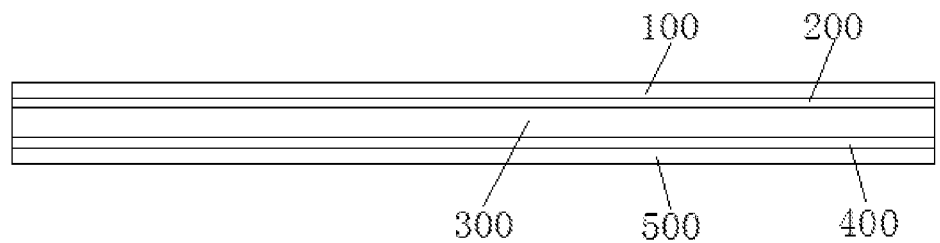
FIG. 1 is a schematic sectional view of a PDLC membrane provided by an embodiment of the disclosure.

10—front side half-cut area; 20—back side half-cut area; 100—first PET layer (first base membrane); 200—first electric conduction layer;
300—liquid crystal layer; 400—second electric conduction layer; 500—second PET layer (second base membrane);
600—negative pressure platform; 610—first transparent area; 620—second transparent area; 630—transparent area; 640—main body area; 650—vent hole;
700—vacuum device; and 710—valve.

DETAILED DESCRIPTION OF EMBODIMENTS

In order to make the objectives, technical solutions and advantages of the present disclosure clearer, the technical solutions in the embodiments of the present disclosure will be described clearly and completely with reference to the drawings. Obviously, the described embodiments are part of the embodiments of the present disclosure, not all of them. The components of the embodiments of the present disclosure described and illustrated in the drawings herein may be generally arranged and designed in a variety of different configurations.

Therefore, the following detailed description of the embodiments of the present disclosure, provided in the drawings, is not intended to limit the scope of the claimed present disclosure, but merely represents selected embodiments of the present disclosure. Based on the embodiments in the present disclosure, all other embodiments obtained by those ordinarily skilled in the art without creative work shall fall within the protection scope of the present disclosure.

It should be noted that similar reference numbers and letters indicate similar items in the following drawings. Therefore, once a certain item is defined in one drawing, it does not need to be further defined and explained in the subsequent drawings.

In the description of the present disclosure, it should be noted that the orientation or positional relationship indicated by the terms such as "center", "upper", "lower", "left", "right", "vertical", "horizontal", "inner", "outer", "front side", "back side", is based on the orientation or positional relationship shown in the drawings, or the orientation or positional relationship when the product of the invention is usually placed in use, and it is only for the convenience of describing the present disclosure and simplifying the description, rather than indicating or implying that the indicated device or element must be of the specific orientation, or be configured and operated in the specific orientation, and therefore cannot be understood as a limitation to the present disclosure. In addition, the terms "first", "second", "third", etc. are only used for describing the distinguishing, and cannot be understood as indicating or implying the importance of the relativity.

In addition, terms, such as "horizontal" and "vertical", do not mean that the component is required to be absolutely horizontal or overhanging, but may be slightly inclined. For example, "horizontal" only means that its direction is more horizontal than "vertical", which does not mean that the structure must be completely horizontal, but can be slightly inclined.

In the description of the present disclosure, it should also be noted that, unless otherwise clearly stipulated and defined, the terms such as "provide", "mount", "link", "connect", should be understood in a broad sense, and for example, they may be fixedly connected and can also be detachably connected or integrally connected; or they can be mechanically connected or electrically connected; or they can be directly connected or indirectly connected through an intermediate medium, and the two components can be the internally communicated. For those ordinarily skilled in the art, the specific meanings of the above-mentioned terms in the present disclosure can be understood in specific situations.

The term "negative pressure platform" as used herein has the meaning commonly understood by those skilled in the art. "Negative pressure" refers to any suitable negative pressure that allows the PDLC membrane to be processed to be adsorbed onto the platform so that it remains flat and does not warp. The size and shape of the negative pressure platform can be set according to the PDLC membrane to be processed and the desired product. The negative pressure platform can be of various possible shapes.

The negative pressure platform in the present disclosure comprises a transparent area. The term "transparent area" as used herein refers to an area made of transparent material. The transparent material can allow laser light to transmit therethrough, thereby minimizing the absorption and reflection for laser light. In the present disclosure, the main body area of the negative pressure platform is usually a metal material area, taking into account the characteristics of low wear and long service life of the metal material, but any other suitable material may also be used, and for example, it is a transparent material as well.

The negative pressure platform in the present disclosure comprises a negative pressure bonding area.

The term "liquid crystal activation area" as used herein refers to the area of the PDLC membrane where the liquid crystal layer needs to be activated. The transparent area of the negative pressure platform is adapted to the "liquid crystal activation area".

The term "other area" as used herein refers to the area of the PDLC membrane other than the "liquid crystal activation area". The "other area" is adapted to the main body area of the negative pressure platform (for example, the metal material area). The "other area" may also be referred to as "non-liquid crystal activation area".

The term "half-cut area" as used herein refers to an area on the negative pressure platform, used to guide where to cut and tear off the PDLC membrane. The half-cut area on the negative pressure platform may be located more inwardly than the transparent area, or may coincide with the innerside boundary of the transparent area. The sizes and shapes of the half-cut area and the transparent area on the negative pressure platform can all be changed in any appropriate way, as needed.

Hereinafter, some embodiments of the present disclosure will be described in detail with reference to the drawings. In the case of no conflict, the following embodiments and features in the embodiments can be combined with each other.

Figure 2:
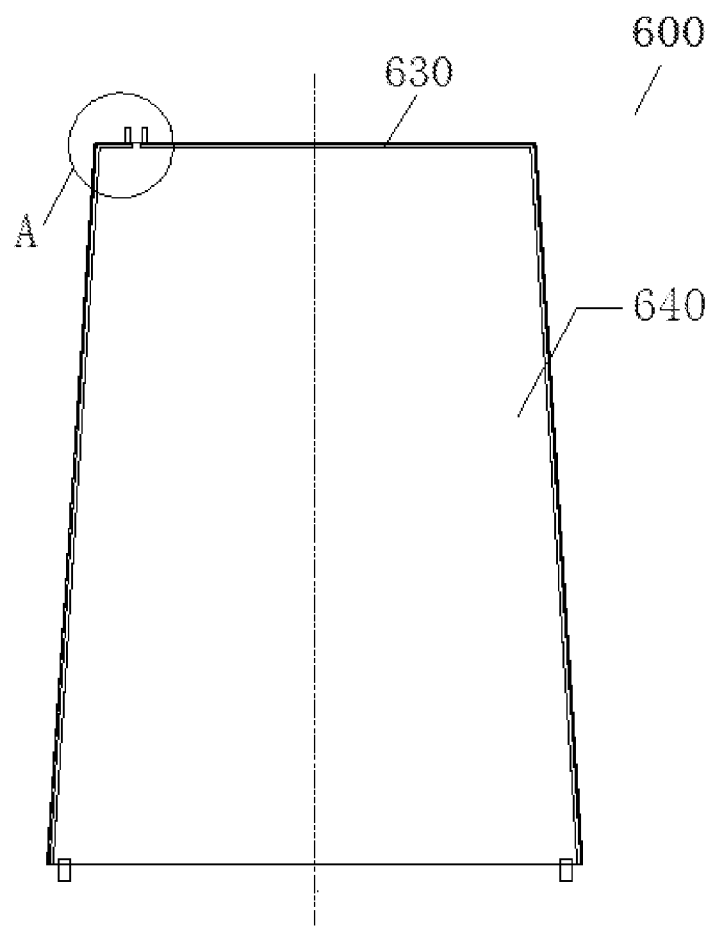
FIG. 2 is a schematic top view of a negative pressure platform provided by an embodiment of the disclosure.
Figure 3:
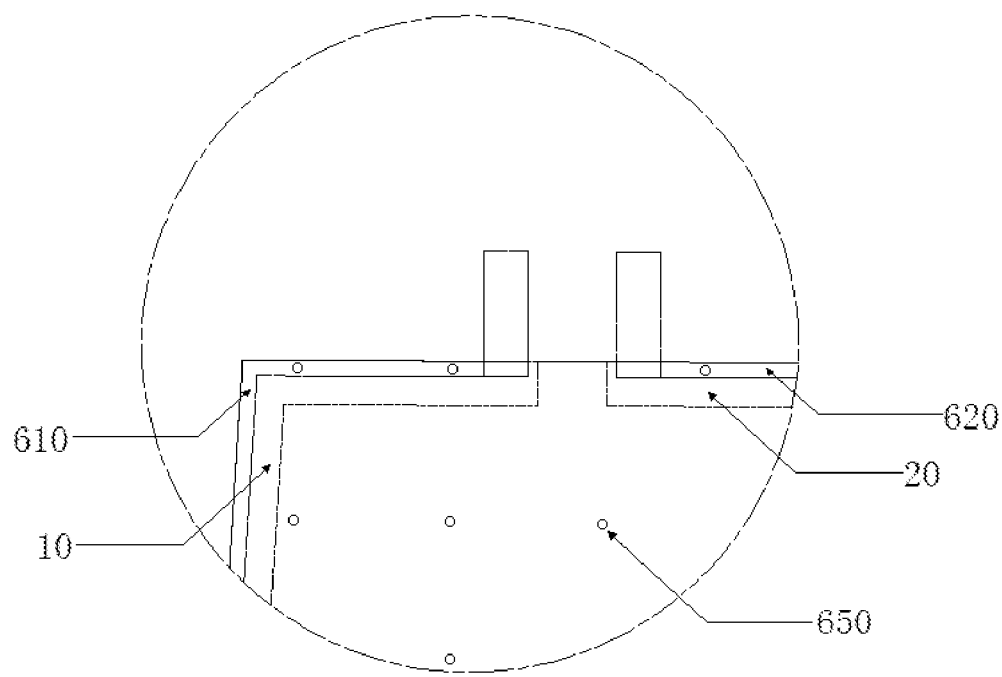
FIG. 3 is a partial enlarged schematic diagram of A part shown in FIG. 2.

This embodiment provides a method for manufacturing a PDLC membrane electrode. Referring to FIGS. 1 to 3, the method for manufacturing a PDLC membrane electrode comprises the following steps:

placing the PDLC membrane on the negative pressure platform 600 with the side to be processed facing upwards, and making the liquid crystal activation area of the side to be processed of the PDLC membrane coincide with the transparent area 630 of the negative pressure platform 600, and the other areas coincide with the metal material area of the negative pressure platform 600;

activating the liquid crystal layer of the PDLC membrane (the liquid crystal activation area of the side to be processed); and cutting and tearing off, according to the half-cut area, the PET layer and the electric conduction layer located on the liquid crystal layer 300, and sweeping off the activated liquid crystal layer 300 to expose the electric conduction layer located under the liquid crystal layer 300 to form a corresponding electrode. In this embodiment, the method for manufacturing a PDLC membrane electrode may include a front side processing step and a back side processing step.

Specifically, referring to FIGS. 2 and 3, the PDLC membrane is placed on the negative pressure platform 600 with the front side facing upwards, and the front side liquid crystal activation area of the PDLC membrane coincides with the first transparent area 610 of the negative pressure platform 600, and the other areas coincides with the metal material area of the negative pressure platform 600. The liquid crystal layer 300 of the PDLC membrane (the front side liquid crystal activation area) is activated. According to the front side half-cut area 10, the first PET layer 100 and the first electric conduction layer 200 located on the liquid crystal layer 300 are cut and torn off. The activated liquid crystal layer 300 is swept off to expose the second electric conduction layer 400 to form a first electrode.

The PDLC membrane is placed on the negative pressure platform 600 with the back side facing upwards, and the back side liquid crystal activation area of the PDLC membrane is made to coincide with the second transparent area 620 of the negative pressure platform 600, and other areas coincide with the metal material area of the negative pressure platform 600. The liquid crystal layer 300 of the PDLC membrane (the back side liquid crystal activation area) is activated. According to the back side half-cut area 20, the second PET layer 500 and the second electric conduction layer 400 located on the liquid crystal layer 300 are cut and torn off. The activated liquid crystal layer 300 is swept off to expose the first electric conduction layer 200 to form a second electrode. Optionally, in the activation step, an infrared laser is used for activation.

In some embodiments, when an infrared laser is used for activation, the infrared laser can use the following parameters, wherein the wavelength range is 955~1068 nm;
the frequency range is 20~80 khz;
the energy range is 1~5 J/sec;
the filling density range is 0.002~0.05 mm;
the processing speed range is 500~8000 mm/sec;
the processing thickness range is 0.05~0.3 mm;
the processing width range is 1~20 mm; and
the processing time range is 2 hr.

In some embodiments, when cutting according to the half-cut area, a carbon dioxide laser is used for cutting.

In some embodiments, when a carbon dioxide laser is used for cutting, the carbon dioxide laser can use the following parameters, wherein the wavelength is 9.3~10.6 μm;
the power is 60~120 W;
the frequency range is 30~100 khz; and
the cutting speed range is 80~200 mm/sec. Optionally, the PET layer and the electric conduction layer located on the liquid crystal layer are manually or mechanically torn off according to the half-cut area.

It should be noted that FIGS. 2 and 3 only exemplarily show the negative pressure platform in the case of activating the side part of the PDLC membrane, where the first transparent area and the second transparent area can be arranged in different ways, such as having different sizes and shapes.

In other words, the front and back sides of the PDLC membrane can be processed in different sizes and shapes, and the processing parameters can also be set differently. In the present disclosure, the terms "front side" and "back side" are only used to distinguish two opposite surfaces of the PDLC membrane, and do not indicate a specific order, structure or the like.

It should also be noted that, in the front side processing step, the activated liquid crystal layer 300 has basically separated from the first electric conduction layer 200 and the second electric conduction layer 400. After the first PET layer 100 and the first electric conduction layer 200 are torn off, a part of the liquid crystal layer 300 can be taken away, and a part of the liquid crystal layer 300 remains in the second electric conduction layer 400. It is possible to use a brush, dust-free cloth or technical foam, etc., to sweep off the remaining part of liquid crystal layer 300, exposing the second electric conduction layer 400, to form the first electrode. Similarly, the same operation can be used for the back side processing steps, which will not be repeated here. However, if the liquid crystal is not activated, the manual wiping, using e.g. alcohol, is required to wipe off the liquid crystal layer 300, which is not only inefficient, but also possible of having the problems, such as incomplete wiping or excessive wiping, which affects the performance of the electrode.

In the method for manufacturing the PDLC membrane electrode provided by this embodiment, the liquid crystal activation area of the side to be processed of the PDLC membrane coincides with the transparent area 630 of the negative pressure platform 600, and other areas coincide with the metal material area of the negative pressure platform 600. With this arrangement, during performing the activation, the laser light can be made to only penetrate to the transparent area of the negative pressure platform, and not touch the main body area of the negative pressure platform (for example, the metal material area). Since laser light absorbed and reflected by the transparent area is relatively small, a better liquid crystal activation effect is achieved, which is beneficial to the removal of the liquid crystal layer. In addition, it is possible to prevent the laser from passing through the transparent area and acting on, for example, the metal material area to generate heat, causing the PDLC membrane to be burned out, thereby improving the pass rate of the PDLC membrane. In addition, the method for manufacturing a PDLC membrane electrode can reduce the participation by human, increasing the production output, and improving the production efficiency. In addition, according to the different cutting areas, the electrode can be made according to any pattern.

This embodiment also provides a method for manufacturing a PDLC membrane electrode. Referring to FIGS. 1 to 3, the method for manufacturing a PDLC membrane electrode comprises the following steps:

placing the PDLC membrane on the negative pressure platform 600 with the side to be processed facing upwards, wherein the negative pressure platform 600 comprises a transparent area 630 and a main body area 640, and the liquid crystal activation area of the side to be processed of the PDLC membrane and the transparent area 630 of the negative pressure platform 600 are made to coincide with each other, and other areas coincide with the main body area 640 of the negative pressure platform 600;

activating the liquid crystal layer of the liquid crystal activation area on the side to be processed of the PDLC membrane; and cutting, according to the half-cut area, the PET layer and the electric conduction layer located on the liquid crystal layer 300, and tearing off the PET layer, the electric conduction layer and the activated liquid crystal layer 300 together to expose the electric conduction layer below the liquid crystal layer 300 to form the corresponding electrode.

In some embodiments, the method for manufacturing a PDLC membrane electrode may include a front side processing step and a back side processing step.

Specifically, referring to FIGS. 2 and 3, the PDLC membrane is placed on the negative pressure platform 600 with the front side facing upwards, and the front side liquid crystal activation area of the PDLC membrane is made to coincide with the first transparent area 610 of the negative pressure platform 600, and the other areas coincide with the main body area 640 of the negative pressure platform 600; the liquid crystal layer 300 of the front side liquid crystal activation area of the PDLC membrane is activated; the first PET layer 100 and the first electric conduction layer 200 located on the liquid crystal layer 300 are cut according to the front side half-cut area 10, and the first PET layer 100, the first electric conduction layer 200, and the activated liquid crystal layer 300 are together torn off to expose the second electric conduction layer 400 to form a first electrode.

The PDLC membrane is placed on the negative pressure platform 600 with the back side facing upwards, and the back side liquid crystal activation area of the PDLC membrane is made to coincide with the second transparent area 620 of the negative pressure platform 600, and other areas coincide with the main body area 640 of the negative pressure platform 600; the liquid crystal layer 300 in the back side liquid crystal activation area of the PDLC membrane is activated; according to the back side half-cut area 20, the second PET layer 500 and the second electric conduction layer 400 located on the liquid crystal layer 300 are cut, and the second PET layer 500, the second electric conduction layer 400 and the activated liquid crystal layer 300 are torn off together to expose the first electric conduction layer 200 to form a second electrode.

In some embodiments, the main body area 640 of the negative pressure platform 600 is a metal material area.

Figure 4:
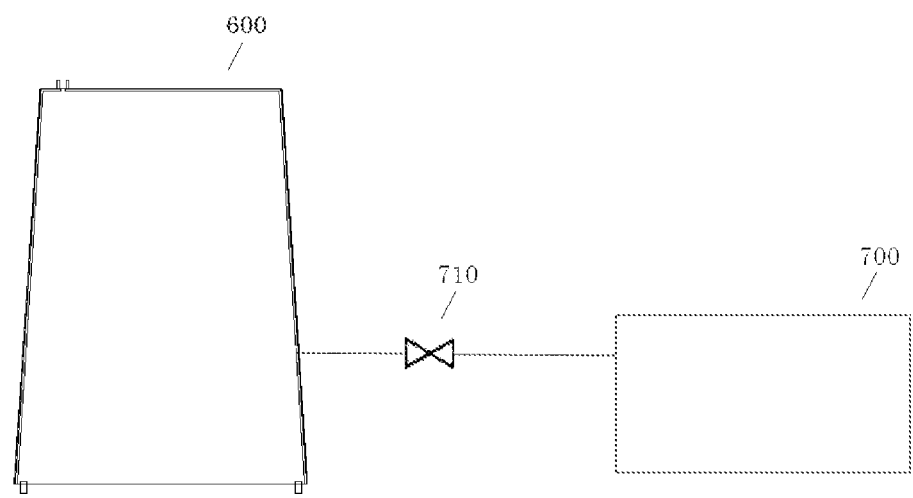
FIG. 4 is a schematic view showing the negative pressure platform provided by an embodiment of the disclosure and the vacuum device in the fluid communication.

Referring to FIGS. 3 and 4, the negative pressure platform 600 may include a plurality of vent holes 650. In some embodiments, the main body area 640 of the negative pressure platform comprises a plurality of vent holes 650. In some embodiments, the transparent area 630 of the negative pressure platform comprises a plurality of vent holes 650. In some embodiments, both the main body area 640 and the transparent area 630 of the negative pressure platform include a plurality of vent holes 650. Each vent hole 650 is in fluid communication with a vacuum device (for example, a vacuum pump) 700. In some embodiments, the vent hole 650 has a diameter of 0.5 to 3.0 mm, 0.8 to 2.5 mm, or 1 to 2 mm. In some embodiments, the hole spacing between adjacent vent holes 650 is 10-50 mm, 15-40 mm, or 20-30 mm. In some embodiments, a valve 710 (such as a solenoid valve) is provided between the vent hole 650 and the vacuum device (such as a vacuum pump) 700. The valve 710 can control the fluid communication between the vent hole 650 and the vacuum device 700, for example, opening or cut off the fluid communication between the two. The vacuum device 700 provides negative pressure, so that the PDLC membrane to be processed can be smoothly adsorbed on the negative pressure platform 600 without warping, and the start and stop of the vacuum adsorption can be controlled through the PLC control terminal.

In some embodiments, in the activation step, an infrared laser is used for activation.

In some embodiments, when an infrared laser is used for activation, the infrared laser uses the following parameters, wherein the wavelength range is 955~1068 nm;
the frequency range is 20~80 khz;
the energy range is 1~5 J/sec;
the filling density range is 0.002~0.05 mm;
the processing speed range is 500~8000 mm/sec;
the processing thickness range is 0.05~0.3 mm;
the processing width range is 1~20 mm; and
the processing time range is 2 hr.

In some embodiments, when cutting according to the half-cut area, a carbon dioxide laser is used for cutting.

In some embodiments, when a carbon dioxide laser is used for cutting, the carbon dioxide laser can use the following parameters, wherein the wavelength is 9.3~10.6 μm;
the power is 60~120 W;
the frequency range is 30~100 khz, and
the cutting speed range is 80~200 mm/sec.

In some embodiments, the PET layer and the electric conduction layer located on the liquid crystal layer are torn off manually or mechanically according to the half-cut area.

It should be noted that, as shown in FIG. 2 and FIG. 3, the aforementioned "main body area" is the part of the negative pressure platform 600, which remains after removing the first transparent area 610 and the second transparent area 620.

It should also be noted that in the above-mentioned front side processing step, the activated liquid crystal layer 300 has been separated from the second electric conduction layer 400. After the first PET layer 100 and the first electric conduction layer 200 are torn off, all of the liquid crystal layer 300 can be taken away, with no liquid crystal layer 300 leaving on the second electric conduction layer 400, therefore there is no need for a sweeping step; and similarly, the same operation can be used for the back side processing step, which will not be repeated here. However, if the liquid crystal is not activated or the activation effect is not enough to take away all of the liquid crystal layer 300, it is necessary to manually wipe, with e.g. alcohol, to wipe off the liquid crystal layer 300, or use other methods to clean the remaining liquid crystal layer 300, which is not only inefficient, but also possible of having the problem of incomplete wiping or excessive wiping, which affects the performance of the electrode.

In addition, due to the reasons, such as, the liquid crystal activation effect is better in the method of this embodiment and better liquid crystal layer removal is achieved, the PDLC membrane, which is obtained by the above processing method, will obtain a resistance value in a stable range when measured by resistance gauge. Especially, when there is no need to sweep the liquid crystal layer, it is possible to eliminate the shortcomings caused by manual wiping of the liquid crystal layer so that the obtained PDLC membrane has a resistance value in a stable range. For example, as for a PDLC membrane with an electric conduction layer being of 160 ohm before processing, the measured resistance value is 250±50 ohm after the electrode is fabricated by the above method, and the customer standard is usually below 300 ohm. However, if the liquid crystal layer is not activated or the activation effect is not good, manual wiping is required. Because manual wiping has differences caused by human and the uncertainty of the wiping effect, it is usually time-consuming and difficult to obtain a resistance value in a stable range. The resistance value of the electrode obtained by wiping the liquid crystal layer may be as high as 500 ohm.

In summary, the method for manufacturing a PDLC membrane electrode can have the following advantages.

(1) The activation of the liquid crystal layer is performed in combination with the transparent area of the negative pressure platform, to achieve a better liquid crystal activation effect, which can make part or all of the liquid crystal layer and the electric conduction layer torn off together, simplifying or avoiding the steps of sweeping the liquid crystal layer.

(2) The resistance value after the production is in a stable range.

(3) The laser cutting is adopted with the laser being used for the non-contact cutting, which will not cause the double-layer membrane to be separated due to an external force.

(4) It can be cut according to any patterns without masking.

(5) The participation by human is reduced and the production efficiency is improved.

This embodiment also provides a negative pressure platform 600 that implements the aforementioned method for manufacturing a PDLC membrane electrode. The negative pressure platform 600 comprises a transparent area 630 that matches the liquid crystal activation area of the PDLC membrane. The main body area 640 of the negative pressure platform 600 may be a metal material area or area made of any other suitable material.

In some embodiments, the negative pressure platform 600 comprises a first transparent area 610 (coinciding with the front side liquid crystal activation area), a second transparent area 620 (coinciding with the back side liquid crystal activation area), and a main body area 640 (for example, a metal material area).

In some embodiments, the material of the metal material region is steel or aluminum.

In some embodiments, the material of the transparent region 630 is transparent organic glass or inorganic glass. In some embodiments, the material of the transparent region 630 is a transparent polyacrylic resin, such as polymethyl methacrylate (acrylic). In some embodiments, the material of the transparent region 630 is transparent polymethyl methacrylate (acrylic) or crystal glass.

In this embodiment, the negative pressure platform 600 may be of a plate-shaped structure.

In some embodiments, the thickness of the negative pressure platform 600 is greater than 15 mm. Exemplarily, the thickness of the negative pressure platform 600 may be 15 mm, 16 mm, 17 mm, or the like. In addition, the thickness of the negative pressure platform 600 is generally less than 20 mm.

The negative pressure platform provided in this embodiment can be applied to the aforementioned method for manufacturing a PDLC membrane electrode. Here, the technical advantages and effects achieved by the method for manufacturing a PDLC membrane electrode also include the technical advantages and effects achieved by the negative pressure platform, which is not repeated again here.

As shown in FIG. 1, this embodiment also provides a PDLC membrane produced by the aforementioned method for manufacturing a PDLC membrane electrode. The PDLC membrane comprises a membrane body, a first electrode (not shown in the drawings), and a second electrode (not shown in the drawings). The membrane body comprises a first PET layer 100, a first electric conduction layer 200, a liquid crystal layer 300, a second electric conduction layer 400, and a second PET layer 500, which are included sequentially from top to bottom. The first electrode is provided on the second electric conduction layer 400; and the second electrode is provided on the first electric conduction layer 200.

The PDLC membrane provided in this embodiment can be manufactured by the aforementioned method for manufacturing a PDLC membrane electrode, wherein the technical advantages and effects achieved by the PDLC membrane also include the technical advantages and effects achieved by the method for manufacturing a PDLC membrane electrode, which will not be repeated again here.

Finally, it should be noted that the above individual embodiments are only used to illustrate the technical solutions of the present disclosure, not to limit it. Although the present disclosure has been described in detail with reference to the foregoing individual embodiments, those ordinarily skilled in the art should understand that the technical solutions recorded in the foregoing individual embodiments can still be modified, or some or all of the technical features thereof can be equivalently replaced and these modifications or replacements do not make the essence of the corresponding technical solutions deviate from the scope of the technical solutions of the embodiments of the present disclosure.

INDUSTRIAL APPLICABILITY

In summary, the present disclosure provides a method for manufacturing a PDLC membrane electrode, a negative pressure platform, and a PDLC membrane, which can reduce participation by human, improve production efficiency, and produce a PDLC membrane with improved electrode performance. In addition, depending on different cutting areas, the electrode can be made according to any patterns.

What is claimed is:

1. A method for manufacturing a PDLC membrane electrode, comprising following steps:
    placing a PDLC membrane on a negative pressure platform with a side to be processed facing upwards, and making a liquid crystal activation area of the side to be processed of the PDLC membrane coincide with a transparent area of the negative pressure platform, and other area coincide with a metal material area of the negative pressure platform;
    activating a liquid crystal layer of the PDLC membrane; and
    cutting and tearing off, according to a half-cut area, a PET layer and an electric conduction layer located on the liquid crystal layer, and sweeping off an activated liquid crystal layer to expose an electric conduction layer located under the liquid crystal layer to form a corresponding electrode;
    the method for manufacturing a PDLC membrane electrode further comprising a front side processing step and a back side processing step, wherein
    the PDLC membrane is placed on the negative pressure platform with a front side facing upwards, and a front side liquid crystal activation area of the PDLC membrane is made to coincide with a first transparent area of the negative pressure platform, and other area coincides with the metal material area of the negative pressure platform; the liquid crystal layer of the PDLC membrane is activated; according to a front side half-cut area, a first PET layer and a first electric conduction layer located on the liquid crystal layer are cut and torn off, and the activated liquid crystal layer is swept off to expose a second electric conduction layer to form a first electrode; and
    the PDLC membrane is placed on the negative pressure platform with a back side facing upwards, and a back side liquid crystal activation area of the PDLC membrane is made to coincide with a second transparent area of the negative pressure platform and other area coincides with the metal material area of the negative pressure platform; the liquid crystal layer of the PDLC membrane is activated; according to a back side half-cut area, a second PET layer and the second electric conduction layer located on the liquid crystal layer are cut and torn off, and the activated liquid crystal layer is swept off to expose the first electric conduction layer to form a second electrode;
    wherein in an activation step, an infrared laser is used for performing activation.

2. The method for manufacturing a PDLC membrane electrode according to claim 1, wherein when the infrared laser is used for performing activation, the infrared laser uses following parameters, wherein
    a wavelength range is 955~1068 nm;
    a frequency range is 20~80 khz;
    an energy range is 1~5 J/sec;
    a filling density range is 0.002~0.05 mm;
    a processing speed range is 500~8000 mm/sec;
    a processing thickness range is 0.05~0.3 mm;
    a processing width range is 1-20 mm; and
    a processing time range is 2 hr.

3. A negative pressure platform for implementing the method for manufacturing a PDLC membrane electrode according to claim 1, wherein the negative pressure platform comprises a metal material area and a transparent area, with the transparent area being matched with the liquid crystal activation area of the PDLC membrane.

4. The negative pressure platform according to claim 3, wherein material of the metal material area is steel or aluminum.

5. The negative pressure platform according to claim 3, wherein material of the transparent area is transparent polymethyl methacrylate or crystal glass.

6. The negative pressure platform according to claim 3, wherein the negative pressure platform is of a plate-shaped structure.

7. The negative pressure platform according to claim 6, wherein the negative pressure platform comprises a plurality of vent holes in fluid communication with a vacuum device.

8. A method for manufacturing a PDLC membrane electrode,
    wherein the PDLC membrane comprises: a liquid crystal layer; electric conduction layers, respectively arranged on both sides of the liquid crystal layer; and base membranes, respectively arranged on outer sides of the electric conduction layers; and
    the method comprises following steps:
    placing the PDLC membrane on a negative pressure platform with a side to be processed facing upwards, wherein the negative pressure platform comprises a transparent area and a main body area, and making a liquid crystal activation area of the PDLC membrane coincide with the transparent area of the negative pressure platform, and other area fit to the main body area of the negative pressure platform;
    activating the liquid crystal layer of the liquid crystal activation area of the side to be processed of the PDLC membrane; and
    cutting, according to a half-cut area, a base membrane and an electric conduction layer located on the liquid crystal layer, and tearing off the base membrane, the electric conduction layer and an activated liquid crystal layer together to expose an electric conduction layer located under the liquid crystal layer to form a corresponding electrode;
    wherein the method for manufacturing a PDLC membrane electrode further comprising a front side processing step and a back side processing step, wherein
    the PDLC membrane is placed on the negative pressure platform with a front side facing upwards, and a front side liquid crystal activation area of the PDLC membrane is made to coincide with a first transparent area of the negative pressure platform and other area is attached to the main body area of the negative pressure platform; the liquid crystal layer of the front side liquid crystal activation area of the PDLC membrane is activated; according to a front side half-cut area, a first base membrane and a first electric conduction layer located on the liquid crystal layer are cut, and the first base membrane, the first electric conduction layer and the activated liquid crystal layer are together torn off to expose a second electric conduction layer to form a first electrode; and the PDLC membrane is placed on the negative pressure platform with a back side facing upwards, and a back side liquid crystal activation area of the PDLC membrane is made to coincide with a second transparent area of the negative pressure platform and other area is attached to the main body area of the negative pressure platform; the liquid crystal layer of the back side liquid crystal activation area of the PDLC membrane is activated; according to a back side half-cut area, a second base membrane and the second electric conduction layer located on the liquid crystal layer are cut, and the second base membrane, the second electric conduction layer and the activated liquid crystal layer are together torn off to expose the first electric conduction layer to form a second electrode;

wherein in an activation step, an infrared laser is used for activation.

9. The method for manufacturing a PDLC membrane electrode according to claim 8, wherein the base membrane is a PET layer.

10. The method for manufacturing a PDLC membrane electrode according to claim 8, wherein the infrared laser uses following parameters, wherein a wavelength range is 955~1068 nm;
a frequency range is 20~80 khz;
an energy range is 1~5 J/sec;
a filling density range is 0.002~0.05 mm;
a processing speed range is 500~8000 mm/sec;
a processing thickness range is 0.05~0.3 mm;
a processing width range is 1-20 mm; and
a processing time range is 2 hr.

11. The method for manufacturing a PDLC membrane electrode according to claim 8, wherein material of the transparent region is selected from transparent organic glass or inorganic glass.

12. The method for manufacturing a PDLC membrane electrode according to claim 11, wherein the material of the transparent region is selected from transparent polymethyl methacrylate or crystal glass.

13. The method for manufacturing a PDLC membrane electrode according to claim 8, wherein the main body area of the negative pressure platform is a metal material area.

14. The method for manufacturing a PDLC membrane electrode according to claim 8, wherein the negative pressure platform comprises a plurality of vent holes in fluid communication with a vacuum device, so that a PDLC membrane to be processed is adsorbed on the platform.

15. The method for manufacturing a PDLC membrane electrode according to claim 8, wherein when cutting according to the half-cut area, a carbon dioxide laser is used for cutting.

* * * * *